(12) United States Patent
Bauer

(10) Patent No.: US 6,529,853 B1
(45) Date of Patent: Mar. 4, 2003

(54) VIRTUAL POSITIONING MEDIA CONTROL SYSTEM

(75) Inventor: Will N. Bauer, Edmonton (CA)

(73) Assignee: Acoustic Positioning Research Inc., Edmonton (CA)

(*) Notice: Subject to any disclaimer, the term of this patent is extended or adjusted under 35 U.S.C. 154(b) by 0 days.

(21) Appl. No.: 09/462,059

(22) PCT Filed: Jul. 14, 1998

(86) PCT No.: PCT/CA98/00684
§ 371 (c)(1),
(2), (4) Date: Jan. 3, 2000

(87) PCT Pub. No.: WO99/05857
PCT Pub. Date: Feb. 4, 1999

Related U.S. Application Data

(60) Provisional application No. 60/053,189, filed on Jul. 21, 1997.

(51) Int. Cl.[7] .............................................. G05B 19/00
(52) U.S. Cl. ....................................... 702/152; 348/169
(58) Field of Search .................................. 702/150, 151, 702/152, 153, 94, 95; 352/174, 178, 85; 382/107, 154, 276, 103; 362/3, 285, 257; 348/169, 172, 170, 208.14, 171, 211.7

(56) References Cited

U.S. PATENT DOCUMENTS

| | | | | |
|---|---|---|---|---|
| 4,566,036 A | * | 1/1986 | Kadosawa | 348/213 |
| 4,720,805 A | | 1/1988 | Vye | 364/525 |
| 4,801,207 A | * | 1/1989 | Williams | 356/376 |
| 5,023,709 A | * | 6/1991 | Kita et al. | 348/172 |
| 5,164,827 A | * | 11/1992 | Paff | 358/108 |
| 5,214,615 A | * | 5/1993 | Bauer | 367/128 |
| 5,220,848 A | * | 6/1993 | Basilico | 74/471 XY |
| 5,502,627 A | * | 3/1996 | Hunt et al. | 362/286 |
| 5,559,695 A | * | 9/1996 | Daily | 364/424.01 |
| 5,627,616 A | | 5/1997 | Sergeant et al. | 354/81 |
| 5,764,786 A | * | 6/1998 | Kuwashima et al. | 382/107 |
| 5,872,594 A | * | 2/1999 | Thompson | 348/213 |
| 5,930,740 A | * | 7/1999 | Mathisen | 702/152 |
| 5,949,685 A | * | 9/1999 | Greenwood et al. | 700/193 |
| 5,953,077 A | * | 9/1999 | Honey et al. | 348/589 |
| 5,990,935 A | * | 11/1999 | Rohlfing | 348/39 |
| 6,009,189 A | * | 12/1999 | Schaack | 382/154 |
| 6,009,210 A | * | 12/1999 | Kang | 382/276 |
| 6,079,862 A | * | 6/2000 | Kawashima et al. | 348/169 |

FOREIGN PATENT DOCUMENTS

EP   0 329 121 A   8/1989   ............ G03B/3/12

* cited by examiner

Primary Examiner—Marc S. Hoff
Assistant Examiner—Jeffrey R West
(74) Attorney, Agent, or Firm—Ridout & Maybee LLP

(57) ABSTRACT

A control system for variably operable devices, such as spotlight systems (16) to follow the movements of a performer (12) over an area, derives control data from a tracking head (14) which follows the movements of the performer (12). The tracking head (14) may be operated manually to follow the performer. A frame of reference (10) is set up over the area (10A), the frame of reference including at least four calibration points (1, 2, 3, 4), any three of which are not collinear. The frame of reference (10) also includes a reference point of origin (C). Prom the X, Y, and Z coordinates of the tracking head with respect to the calibration points and from the pan and tilt angles of the tracking head, control commands for the variably operable apparatus are computed in real time.

37 Claims, 6 Drawing Sheets

VIRTUAL POSITIONING MEDIA CONTROL SYSTEM

This application claims the benefit of provisional application No. 60/053,189, filed Jul. 21, 1997.

TECHNICAL FIELD

This invention relates to a control system for variably operable devices in response to movement of an object within an area, for example, movement of a person moving within an area of large extent such as a sports playing field or arena or an ice rink or stadium although it could also potentially be used in smaller area such as a theatre or T.V. studio.

1. Background Art

There currently exist a number of 3D position tracking technologies which, operating within a variety of constraints, provide a certain number of updates per second over 3D volumes of varying size. One of these technologies is our GAMS (Gesture and Media System) technology as for example described and claimed in U.S. Pat. No. 5,107,746 issued to Will Bauer on Apr. 28, 1992 and U.S. Pat. No. 5,214,615 issued to Will Bauer on May 25, 1993 and U.S. Pat. No. 5,412,619 issued to Will Bauer on May 2, 1995. There are also other systems based on a variety of measurement methodologies. However, when confronted with the problem of tracking high speed movements over large areas such as ice rinks, sports playing field, etc. none of the systems of these patents or other known 3D tracking technology provide a useful tool for using the position of performers in large areas to control electronic media and other variably operable systems such as virtual electronic sets, robots, computer controllable cameras, and the like. The reasons for this are twofold: the first is that the tracking area of coverage is so large; the second is that performers such as professional skaters may move very quickly. Given the combination of these two difficulties presently available, completely automated system cannot currently follow performers moving a high speeds over large areas. Consider a skater performing on an ice rink. Current show performance practice dictates the use of between one to four "followspots" (spot lights which are operated by a human being and are pointed at the performer as he or she moves on the ice). Any other lighting or sound effect must be played back from a recording and the performer must very carefully time their movements to the music and the lighting areas.

Additionally, the need for such 3D information is not confined to performance situations. Often when a show involving lighting is on tour, its preset cues may be adjusted at each venue due to changes in stage shape. If one can move many lights at once to a new location on the stage (which is entirely possible given such 3D information) and automatically refocus them and resize their beam diameters, a considerable saving of time and money results.

The present inventor has, therefore, addressed the problem in a different manner.

2. Disclosure of the Invention

According to the invention there is provided a control system for variably operable apparatus in response to movement of an object over a large area comprising:

a fixed frame of reference for said large area, comprising at least four calibration points any three of which are not collinear;

a further reference point of origin establishing X, Y and Z coordinates of each of said calibration points, the X, Y and Z coordinates being calculable;

a tracking head, having pan and tilt controls for tracking the movement of an object in the large area and measuring pan and tilt angles of the tracking head for each of said calibration points;

a variably operable system and means to establish control positions of the variably operable system for each of said calibration points and for said point of origin;

computer means to calculate in real time from said X, Y and Z coordinates and from said pan and tilt angles, a series of pan and tilt angles for the variably operable system, a series of the X, Y, Z position and/or the pan, tilt and rotation angle offsets of the tracking head and the variably operable system; and means to set in real time the variably operable system into conformity with its calculated pan and tilt angles therefor.

Probably the variably operably system is a lighting or music system which may include a number of spot lamps. One or more spot lamps may be operated at a time and a further spotlamp may take over the operation as the skater moves out of range of a first spotlamp. Probably the moving object is a performer such as a skater, dancer or the like.

The invention also includes a method of controlling variably operable apparatus using the system above described.

An example of such control for an "intelligent" light involves the use of a high speed serial data communications protocol known as "DMX-512". DMX-512 ("DMX" for short) allows a series of lamps to receive commands from a lighting control console, computer, or similarly equipped device. These commands are usually transmitted about 44 times per second and allow control of the pan and tilt angles of the lamp plus brightness, colour, projection pattern ("gobos"), and a variety of other parameters. Using a computer equipped with a DMX interface card, it is a simple matter to write programs which direct the light to point at desired pan/tilt angles or modulate any other controllable parameters by sending the appropriate DMX data over the serial data cable to the light(s) in question.

Such control may also be used to make possible the cross-fading of lamps when a performer moves out of range of one lamp and into range of another lamp. The brightness of the first lamp can be faded down as the performer moves away from one lamp and the brightness of the second lamp can be faded up as the performer moves towards it, thus assuring an even distribution of light on the performer at all times regardless of their position in the stage area.

To understand the functioning of the system, consider a pan/tilt tracking head such as that found on a video camera tripod. This subsystem allows a flat plate (which normally holds a camera or some other imaging device but can hold other things such as a telescopic sighting device) to be rotated about two orthogonal axes (normally referred to as the "pan" and "tilt" axes) by a handle and is thus operable by a human. This tracking head can be pointed in any direction within an almost spherical area, limited only by its mounting methodology. Next, consider a tracking head with shaft encoder or other electronic means to allow measurement of each of the orthogonal pan and tilt angles. From this instrumentation, it is possible to obtain two angular quantities corresponding to the pan and tilt angles at which the head is oriented. These measurements can be obtained sufficiently frequently (up to several thousand times per second, e.g. 100–15000 times per second) as to be considered quasi-continuous for most applications.

If the 3D X,Y,Z location of this tracking head plus any angular pan, tilt, or rotation offsets is known relative to some fixed frame of reference, and if the location of a plane area such as an ice-rink is also known relative to the fixed frame of reference; then it is possible to calculate the distance between the 3D position of the tracking head and a point on the plane area that is collinear with the radial path along which the tracking head is pointed. If the 3D position and angular offsets of the tracking head are known and the pan/tilt angles of where it is pointing are also known, then the coordinates of the point in the plane at which it is pointing can be determined. If the point happens to be, for example, a skater who is moving on an ice rink, as the tracking head is turned to follow the skater, a succession of "virtual" positions are generated giving the skater's position on the ice in three dimensions (assuming that they remain at a constant height above the ice). Thus the instrumented tracking head acts like a 3D position tracking device attached to the skater, creating a series of virtual 3D measurements of the skater's trajectory over the ice surface.

In addition to deriving a Z coordinate as mentioned above by projecting the pointing angle of the pan/tilt head and calculating its point of intersection with a plane at a known height Z=Zp, a radial ranging system can be utilized to measure Z directly and obtain the true value of the Z coordinate. To do this, the distance along the pan/tilt head sight line from the pan/tilt head to the performer (or other target) must be measured. One way to achieve this is to use a laser ranging system mounted parallel to the pan/tilt head's line of sight. Such ranging systems are well known to one skilled in the art and are available with accuracies from several meters to several millimetres.

This virtual positioning information can be used very effectively to control electronic media in response to the performer's trajectory. It is quite possible "map" 3D positions, velocities and/or accelerations onto electronic media behaviours using computer programs with interfaces both to the position transducing equipment and also to common electronic protocols such as DMX (lighting), MIDI (electronic music and machine control), serial communications, other protocols such as TCP/IP and direct digital or analog electronic interfaces for camera pan/tilt control and the like. Some suitable computer programs have been generally described in U.S. Pat. Nos. 5,107,746, 5,214,615 and 5,412,619 previously referred to. The present invention may use such programs but in conjunction with virtual positioning information from the tracking head rather than positioning information derived from a sensor attached to the performer's body.

This is of particular use in large-scale situations which are beyond the current limitations of currently available automated 3D tracking systems. Using the system of the invention, the performer can take direct control of the cuing of the media events for the performance, allowing much more interesting effects to be created and utilized. Thus, instead of up to four human follow-spot operators, only one human is required to operate the virtual position tracking head; the response of all follow-spot lights, other lighting, computer controllable cameras, and other media events such as music, sound effects, and video projection are based on the virtual position information derived from the pointing of the tracking head at the performer as he or she moves on the ice.

In order to use the virtual positioning system, there must be means of establishing the 3D location of both the tracking head and any relevant media, such as computer-controllable moving lights, relative to a fixed frame of reference. To accomplish this task, four calibration points are set on the surface of the ice rink or performing surface. These four points must be set out in such a way that any three of them are not collinear. Distances between them and a fifth centre point that defines the origin of the coordinate system can be used to establish their X and Y coordinate positions relative to the centre point which functions as the coordinate origin. Having established these measurements, the tracking head can be pointed at each of the four calibration points and the pan and tilt angle measurements of the tracking head for each calibration point can be obtained. The computer controlled lights and any other appropriate media may be calibrated in a similar manner. Given this information (knowledge of the X,Y,Z coordinates of the four calibration points relative to the centre plus the pan/tilt angles between the tracking head and follow-spot lights and the calibration points) it is possible to calculate both the X,Y,Z position of each light and tracking head plus the light/tracking head's pan, tilt, rotation angle offsets. Given these six calculated values (X,Y,Z, pan angle offset, tilt angle offset, rotation angle offset) there is complete information to allow the derivation of virtual position information and to allow the lights to be pointed at any virtual points desired.

In addition to pointing the lamps, they can also be automatically focussed and irised based on the virtual positioning information. This ability to auto-iris/focus many lamps on one virtual point is very important for both real-time operation and for pre-show setup where lamp cue positions must be readjusted for each new venue (if a show is on tour).

BRIEF DESCRIPTION OF THE DRAWINGS

Embodiments of the invention will now be described by way of example with reference to the drawings, in which.

MODES OF CARRYING OUT THE INVENTION

Figure 1:
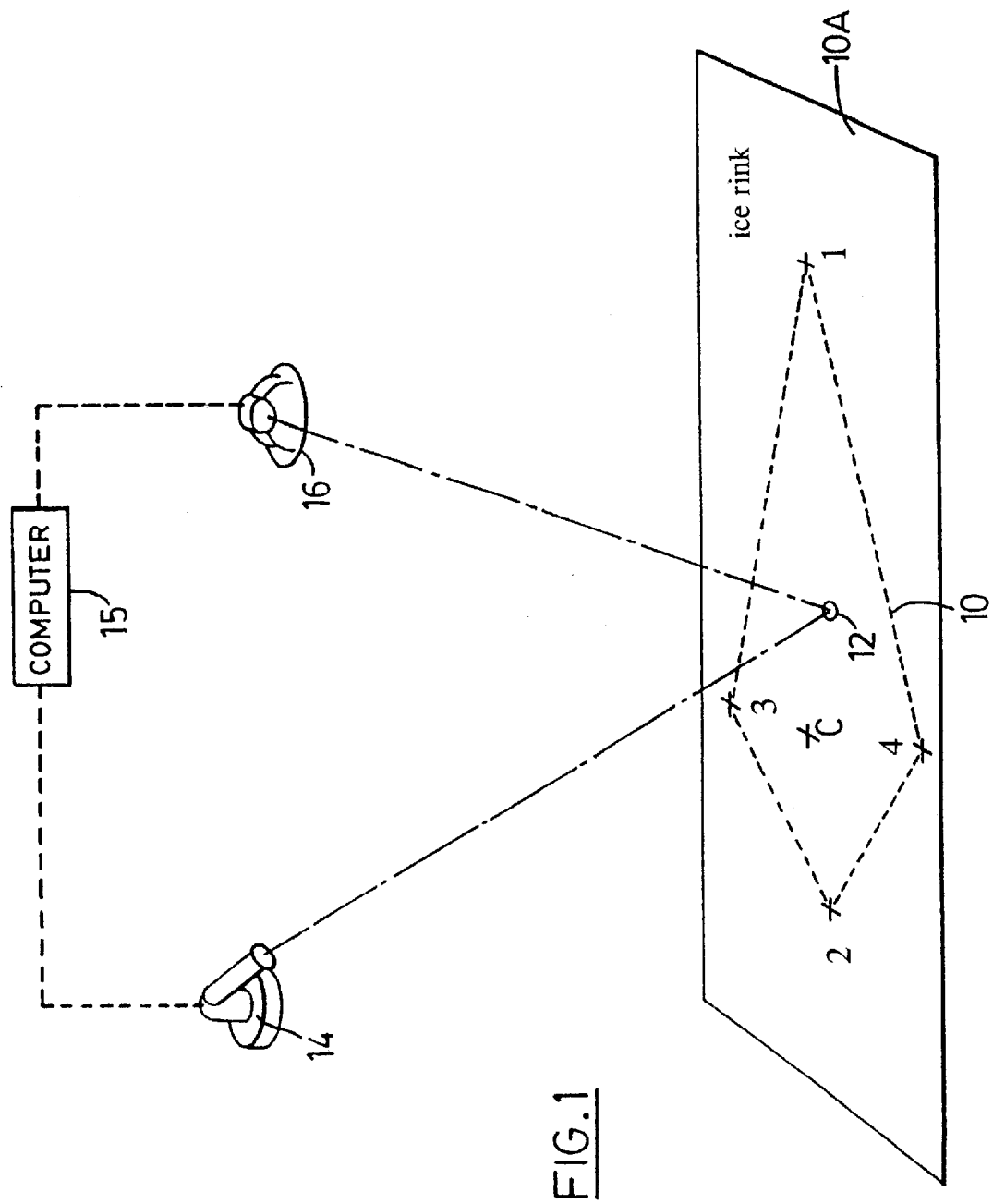
FIG. 1 shows an arrangement of a system of utilizing single spot lamp for a performer on a large area.
Figure 1A:
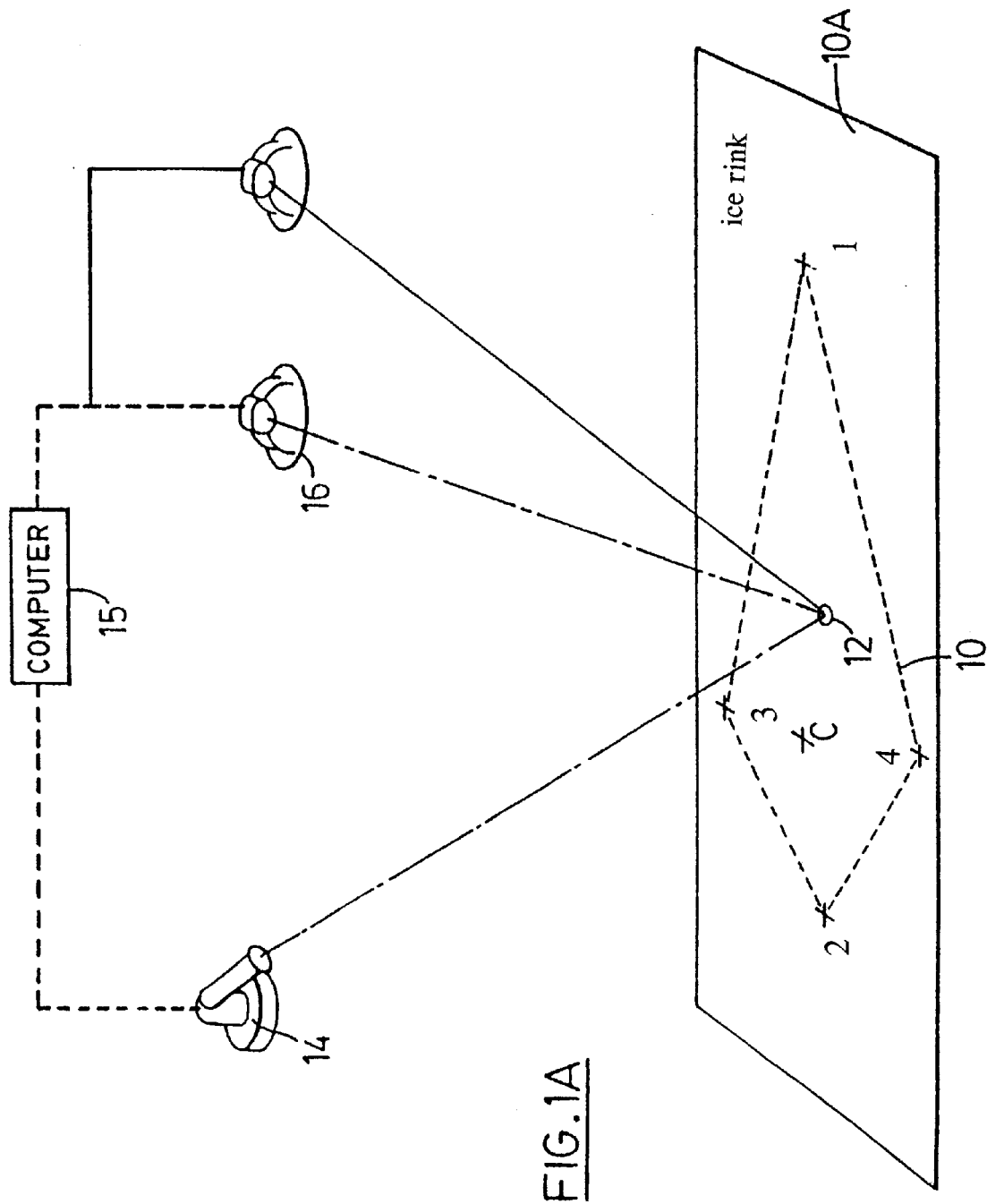
FIG. 1A shows an arrangement similar to that of FIG. 1 utilizing a lighting system comprising a plurality of lamps.
Figure 1B:
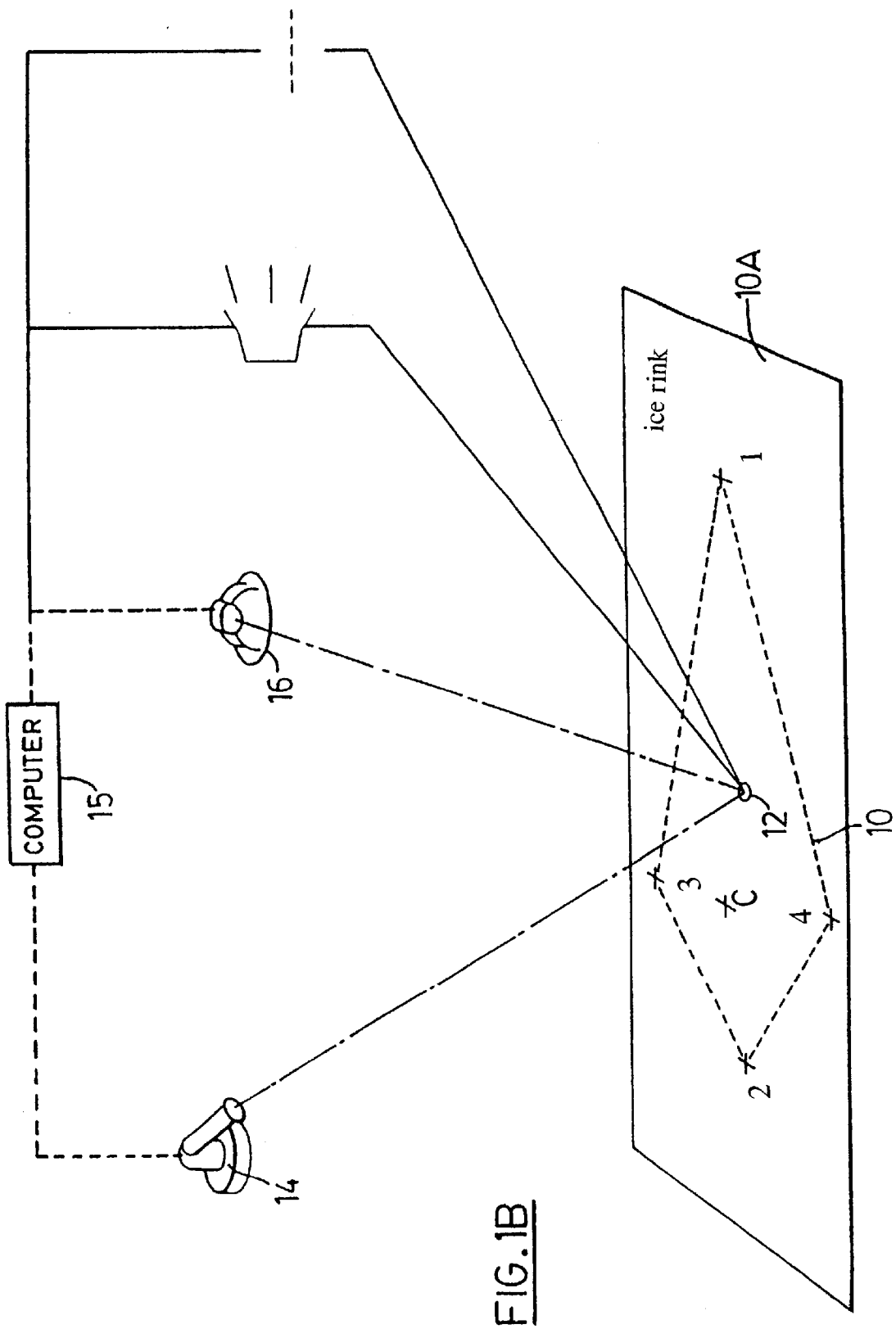
FIG. 1B shows an arrangement similar to that of FIG. 1 utilizing a lighting system, a music system and other systems.

In the drawing, an ice rink 10A has a frame of reference 10 established by calibration points 1, 2, 3 and 4. A further point of origin reference point is marked C. The virtual position 12 of a skater is shown.

The virtual position 12 of a skater may be tracked by tracking head 14 under human control and being capable of a wide range of pan and tilt angles.

The pan and tilt angles of the tracking head are measured by computer 15 and used to calculate pan and tilt angles of a spot light 16 in accordance with an algorithm.

Figure 2:
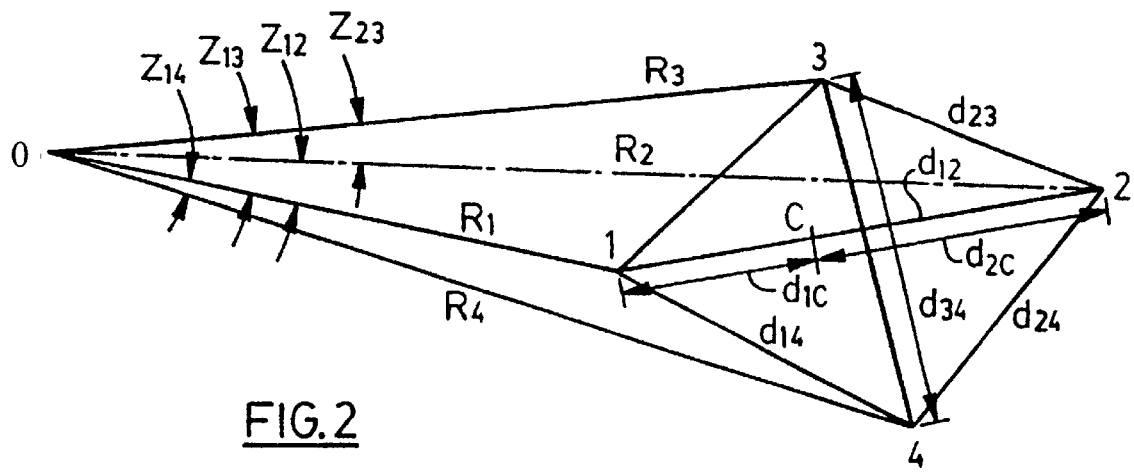
FIG. 2 is a geometric presentation of the position of the tracking head or pan/tilt computer controlled media relative to the centre point and the four calibration points.

For the three dimensional shape as shown in FIG. 2:

0 represents the position of a tracking head or pan/tilt computer controlled media;

1, 2, 3 and 4 are calibration points of reference; and

C is the origin of an arbitrary X,Y,Z coordinate system selected for its utility in serving as a frame of reference for calculations.

It is first desired to calculate the 3D X,Y,Z coordinate position of Object "0" plus its three angular orientation angles (theta, phi, and gamma).

The available information is:
a) Distances $d_{1c}$, $d_{2c}$, $d_{13}$, $d_{23}$, $d_{14}$, and $d_{24}$.
b) Pan and tilt angles $\beta$, $\rho$ for the line segments $R_1$, $R_2$, $R_3$ and $R_4$ connecting point 0 with point 1, 2, 3 and 4 respectively, i.e. a line drawn through point 0 and point 1 can be expressed in radial coordinates (with point 0 as the coordinate origin) of ($R_1$, pan angle, tilt angle) where $R_1$ is the distance between point 0 and point 1 and "pan angle" and "tilt angle" are the pan and tilt angles around two orthogonal axes.

This problem can be solved in four steps:
a) Calculate the X,Y,Z coordinates of points 1, 2, 3 and 4 given the coordinate origin point C at (0,0,0).
b) Solve for radial distances $R_1$, $R_2$, $R_3$ and $R_4$.
c) Solve for the X,Y,Z 3D coordinates of point 0.
d) Solve for the orientation angles (theta, phi, and gamma) of the object at point 0.

The solution of each of these steps is exemplified below:
a) Calculate the X,Y,Z Coordinates of Points 1, 2, 3 and 4

Figure 3:
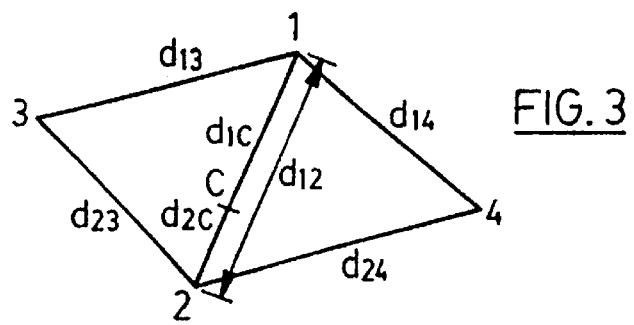
FIG. 3 is another geometric figure.

Consider FIG. 3 comprising four points lying in a single plane (as will be explained below, three points are not enough to solve the problem and a fourth point is needed to obtain a solution).

Points 1 and 2 are collinear with the centre point C and may be defined as lying along the Y axis of the coordinate system with origin C. Points 3 and 4 can be anywhere as long as point 3 is on the left side of the Y axis, point 4 is on the right side of it and no three of points 1, 2, 3, and 4 are collinear. Distances $d_{1c}$, $d_{2c}$, $d_{13}$, $d_{23}$, $d_{14}$ and $d_{24}$ are known. Since points 1 and 2 lie along the Y axis, then, by inspection, their X,Y,Z coordinates are point 1=(0,$d_{1c}$,0)) and point 2=(0,$-d_{2c}$,0) assuming for convenience that the plane is at a height of Z=0 and is parallel to the X-Y plane. Also obvious is the fact that $d_{12} = d_{1c} + d_{2c}$. From the theorem of Pythagoras, $$Y_3 = Y_1 - \frac{(d_{23}^2 + d_{12}^2 - d_{13}^2)}{(2 * d_{12})}$$

and similarly, $$Y_4 = Y_1 - \frac{(d_{24}^2 + d_{12}^2 - d_{14}^2)}{(2 * d_{12})}$$

Knowing which quadrant of the coordinate system point 3 is in, the X coordinate of point 3 can be determined as $$X_3 = -\sqrt{d_{13}^2 - (Y_1 - Y_3)^2}$$

and the X coordinate of point 4 as $$X_4 = \sqrt{d_{14}^2 - (Y_1 - Y_4)^2}$$

Minor variations in solution similar to this one are obvious to one skilled in the art and will not be elaborated upon. X,Y,Z coordinates for points 3 and 4, have thus been found being:
point 3=($X_3$,$Y_3$,0) and
point 4=($X_4$,$Y_4$,0).

It should be noted that the calibration was arbitrarily assumed to be located at Z=0. In fact, it could located at any constant Z value "$Z_{cal}$" without compromising the calculations which follow. The only difference would be that the calculated Z coordinate of the object "O" would have to have $Z_{cal}$ added to it at the end of these calculations.

b) Solve for Radial Distances $R_1$, $R_2$, $R_3$, and $R_4$

Given are pan angles beta ($\beta_n$) and tilt angles rho ($\rho_n$) obtained by pointing tracking head 14 at each of calibration points 1, 2, 3, and 4 (i.e. n=1, 2, 3, 4). Angles $Z_{12}$, $Z_{13}$, $Z_{14}$, and $Z_{23}$ can be calculated. With some manipulation, the expression $$\cos(Z_{mn}) = \cos(\rho_n)*\cos(\rho_m)*\cos(\beta_n - \beta_m) + \sin(\rho_n)*\sin(\rho_m)$$

or $$Z_{mn} = \cos^{-1}[\cos(\rho_n)*\cos(\rho_m)*\cos(\beta_n - \beta_m) + \sin(\rho_n)*\sin(\rho_m)]$$

can be obtained.

Now, from the law of cosines it can be written that:

$$d_{12}^2 = R_1^2 + R_2^2 - 2*R_1*R_2*\cos(Z_{12})$$

$$d_{13}^2 = R_1^2 + R_3^2 - 2*R_1*R_3*\cos(Z_{13})$$

$$d_{14}^2 = R_1^2 + R_4^2 - 2*R_1*R_4*\cos(Z_{14})$$

$$d_{23}^2 = R_2^2 + R_3^2 - 2*R_2*R_3*\cos(Z_{23})$$

Due to the nature of these equations, they are not amendable to normal, "closed-form" solution techniques even though there is enough information (3 equations in 3 unknowns) that a solution is possible. As one example of a solution, R1 can be numerically solved by using a computer to calculate a great many values of solutions of the quadratic equations:

i) $R_1^2 + R_2^2 - 2*R_1*R_2*\cos(Z_{12}) - d_{12}^2 = 0 = F(R_2)$ with $R_1$ fixed.
ii) $R_1^2 + R_3^2 - 2*R_1*R_3*\cos(Z_{13}) - d_{13}^2 = 0 = F(R_3)$ with $R_1$ fixed.
iii) $R_1^2 + R_4^2 - 2*R_1*R_4*\cos(Z_{14}) - d_{14}^2 = 0 = F(R_4)$ with $R_1$ fixed.

It is clear from this that three points would not be roenough to uniquely determine $R_1$ since a quadratic equation's solution has two roots which would result in two possible positions along the $R_1$-point 0 axis.

Equations i) through iii) can be solved for a succession of $R_1$ values, obtaining the following pairs of roots for $R_2$, $R_3$, and $R_4$ for each $R_1$ value from the quadratic equations $R_{2a}$, $R_{2b}$, $R_{3a}$, $R_{3b}$, $R_{4a}$, $R_{4b}$. All possible trios of root values obtained from each $R_1$ value can now be tested. The error test function can be defined as the sum of the absolute values of the functions $F(R_{2root})$, $F(R_{3root})$, and $F(R_{4root})$, i.e.

$$E = |F(R_{2root})| + |F(R_{3root})| + |F(R_{4root})|$$

One of these trios (for the right $R_1$ value) will give a very low error, E. E should ideally be zero since with perfect root and $R_1$ values, $F(R_2) = F(R_3) = F(R_4) = 0$.

The possible root trios are:

($R_{2a}$,$R_{3a}$,$R_{4a}$), ($R_{2a}$,$R_{3a}$,$R_{4b}$), ($R_{2a}$,$R_{3b}$,$R_{4a}$), ($R_{2a}$,$R_{3b}$,$R_{4b}$), ($R_{2b}$,$R_{3a}$,$R_{4a}$), ($R_{2b}$,$R_{3a}$,$R_{4b}$), ($R_{2b}$,$R_{3b}$,$R_{4a}$), ($R_{2b}$,$R_{3b}$,$R_{4b}$).

To solve numerically for $R_1$, $R_2$, $R_3$ and $R_4$:
a) Find the maximum $R_1$ values that could possibly yield a solution, i.e. the largest $R_1$ which yield two real roots for one of equations i), ii), or iii).
b) Cycle through $R_1$ values between $R_{1max\ and\ zero}$, evaluating the error function E for each trial $R_1$ value.
c) Iterate over a steadily narrowing range of $R_1$ values with a successively smaller "step" increment for $R_1$ values until the value of E falls low enough for the accuracy desired.

d) Pick the $R_1$ value with the lowest E and designate the solution to be "$R_{1lowE}$" plus the root trio ("$R_{2lowE}$", "$R_{3lowE}$", and "$R_{4lowE}$") that yielded the lowest E value.

c) Solve for the X,Y,Z 3D Coordinates of Point 0

Figure 4:
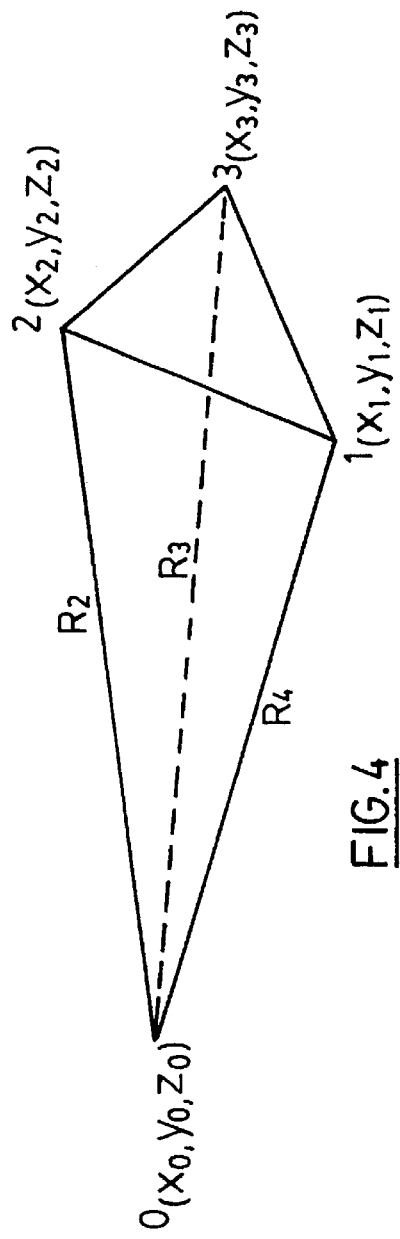
FIG. 4 is a detail of FIG. 2.

Consider the tetrahedron of FIG. 4.

It is desired to solve for $X_o, Y_o, Z_o$. Given is $R_1, R_2, R_3$ plus (X,Y,Z) coordinates for points 1, 2, and 3. It can be written:

$$R_1^2 = (X_o-X_1)^2 + (Y_o-Y_1)^2 + (Z_o-Z_1)^2$$

$$R_2^2 = (X_o-X_2)^2 + (Y_o-Y_2)^2 + (Z_o-Z_2)^2$$

$$R_3^2 = (X_o-X_3)^2 + (Y_o-Y_3)^2 + (Z_o-Z_3)^2$$

These equations can be solved easily by normal methods. A particularly simple and useful case is when $Z_1=Z_2=Z_3$. The following is obtained:

$$X_o = \frac{(R_n^2 - R_m^2 + X_m^2 - X_n^2 + Y_m^2 - Y_n^2 - 2*Y_o*(Y_m-Y_n))}{(2*(X_m - X_n))} \quad \text{i)}$$

$$Y_o = \frac{(R_r^2 - R_q^2 + X_q^2 - X_r^2 + Y_q^2 - Y_r^2 - 2*X_o*(X_q-X_r))}{(2*(Y_q - Y_r))} \quad \text{ii)}$$

$$Z_o = \sqrt{R_s^2 - (X_o - X_s)^2 - (Y_o - Y_s)^2} + Z_s \quad \text{iii)}$$

$s = 1, 2$ or 3.

Clearly, a pair of points (m,n) or (q,r) must be chosen such that $(X_m-X_n) < >0$ and $(Y_q-Y_r) < >0$. An easy way to do this to pick the pairs so that they are both on diagonals as shown in FIG. 5.

Figure 5:
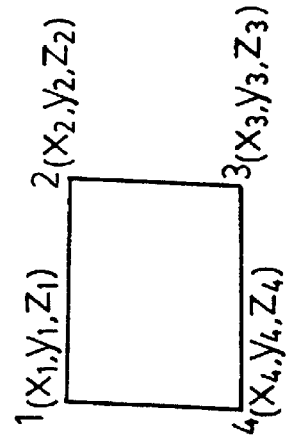
FIG. 5 is a further geometric figure.

In FIG. 5, choose 1,3 as the $X_o$ "m,n" pair and pick 2,4 as the $Y_o$ "q,r" pair.

Substituting and solving equations i) and ii) the following is obtained:

iv) $Y_o = C/[1 + B*(X_q - X_r)/(Y_q - Y_r)]$ where $C = (R_r^2 - R_q^2 + X_q^2 + X_r^2 + Y_q^2 - Y_r^2 - 2A*(X_q - X_r))/(2*(Y_q - Y_r))$ and $B = -(Y_m - Y_n)/(X_m - X_n)$ and $A = (R_n^2 - R_m^2 + X_m^2 - X_n^2 + Y_m^2 - Y_n^2)/(2*(X_m - X_n))$ $X_o$ can be obtained by substituting the $Y_o$ of equations iv) into equation i) at which point $Z_o$ is determined by equation iii).

d) Solve for the Orientation Angles (Theta ($\theta$), Gamma ($\gamma$) and Phi ($\phi$) of the Object at Point 0

To solve for the angular orientation of the object at point 0, the following information is available: pan and tilt angles $\beta$ and $\rho$ respectively obtained by pointing the object at the four points 1, 2, 3, 4 mentioned earlier in this document.

The algorithm for the solution of this sub-objective is as follows:

First the Cartesian coordinates can be calculated using the object's frame of reference and knowledge about the R, $\beta$, and $\rho$ angles that were measured, i.e. X",Y",Z" of the calibration points are calculated relative to the object at the origin of its coordinate system.

Secondly, the rotation angle theta $\theta$ can be calculated based on equations involving the object frame of reference based coordinates of the calibration points (X", Y",Z") and the known X,Y,Z coordinates of the calibration points.

Thirdly, the tilt angle gamma $\gamma$ can be calculated based on the theta $\theta$ value plus more equations comparing the object frame of reference coordinates with the (X,Y,Z) frame of reference of the calibration points.

Fourthly and finally, the pan angle phi $\phi$ can be calculated based on both theta $\theta$ and gamma $\gamma$. This is done numerically because there is often too much error propagation for a closed-form calculation to handle. The numeric solution (where the best phi $\phi$ is chosen to make the predicted calibration point locations match the actual ones) allows phi $\phi$ to be "tuned" to compensate out some of the errors made in calculating theta $\theta$ and gamma $\gamma$ which makes the whole solution work much better.

The solution is based on the fact that one can rotationally transform the object 0's position between the (X,Y,Z) coordinate system established via the four calibration points and an (X",Y",Z") coordinate system having point 0 as its centre. The angles required to properly transform the known (X,Y,Z) coordinates of the calibration points into the (X",Y",Z") coordinates calculable based on the $\beta_n, \rho_n$ pan/tilt angles are the theta $\theta$, gamma $\gamma$, and phi $\phi$ we are searching for.

Our transformation equations between (X,Y,Z) coordinates and (X",Y",Z") coordinates as we apply rotations, in this order, are:

a) Rotation about Z axis:
   i) $X' = X*\text{Cos}(-\theta) + Y*\text{Sin}(-\theta)$
   ii) $Y' = -X*\text{Sin}(-\theta) + Y*\text{Cos}(-\theta)$ b) Rotation about X' axis:
   i) $Y'' = Y'*\text{Cos}(\gamma) + Z*\text{Sin}(\gamma)$
   ii) $Z' = -Y'*\text{Sin}(\gamma) + Z*\text{Cos}(\gamma)$ c) Rotation about Y' axis:
   i) $X'' = X'*\text{Cos}(\phi) + Z'*\text{Sin}(\phi)$
   ii) $Z'' = -X'*\text{Sin}(\phi) + Z'*\text{Cos}(\phi)$ Note that the (X,Y,Z) coordinates given here are really $(X_{cn}-X_o, Y_{cn}-Y_o, Z_{cn}-Z_o)$, i.e. the (X,Y,Z) position relative to the object as the origin of the X,Y,Z coordinate system.

There is enough information to calculate four sets of (X",Y",Z") coordinates, i.e. the calibration point positions as seen from a frame of reference whose origin is the location of the object 0. Clearly, angles $\beta$ and $\rho$ can be expressed (for n=1, 2, 3, 4 signifying calibration points 1, 2, 3, 4 respectively):

$$\beta_n = \text{Tan}^{-1}[(X_o - X_n)/(Z_o - Z_n)]$$

and $$\rho_n = \text{Cos}^{-1}[(Z_o - Z_n)*\sqrt{(1+\text{Tan}^2(\beta_n))}]$$

This can be rewritten for (X",Y",Z") coordinates as:

$$\rho_n = \text{Cos}^{-1}\left[\frac{Z_n'' * \sqrt{(1+\text{Tan}^2(\beta_n))}}{R_n}\right]$$

or $$Z_n'' = \frac{R_n * \text{Cos}(\rho_n)}{\sqrt{1+\text{Tan}^2(\beta_n)}}$$

We can get the sign of $Z''_n$ right by checking $\beta_n$ and making $Z''_n = -Z''_n$ if $\text{Cos}(\beta_n) > 0$.

Similarly, for $X''_n$ $$X''_n = -Z''_n * \text{Tan}(\beta_n)$$

and it follows that $$Y''_n = R_n * \text{Sin}(\rho_n)$$

which also gives us a sign for Y".

Thus $(X''_1, Y''_1, Z''_1)$, $(X''_2, Y''_2, Z''_2)$, $(X''_3, Y''_3, Z''_3)$, and $(X''_4, Y''_4, Z''_4)$ can be calculated using angles $\rho_1 \ldots \rho_4, \beta_1$ ... $\beta_4$, and radial values $R_1 \ldots R_4$ (the radial distances from the object to the four calibration points).

Relative distance coordinates can then be defined as $(X_{r1}, Y_{r1}, Z_{r1})$, $(X_{r2}, Y_{r2}, Z_{r2})$, $(X_{r3}, Y_{r3}, Z_{r3})$, $(X_{r4}, Y_{r4}, Z_{r4})$ to be the positions relative to the object at point 0, i.e.

$X_{rn} = X_n - X_o$ $Y_{rn} = Y_n - Y_o$ $Z_{rn} = Z_n - Z_o$ for n=1,2,3,4

Given all of this, we can solve b)i) for angle theta $\theta$ as:

$$\theta = \mathrm{Tan}^{-1}[J/K]$$

where $J = [(Y_{r2} - Z_{r2}/Zr_1 * Y_{r1}) * (Y''_3 - Z_{r3}/Z_{r1} * Y''_1) - (Y_{r3} - Z_{r3}/Zr_1 * Y_{r1}) * (Y''_2 - Z_{r2}/Z_{r1} * Y''_1)]$ and $K = [(Y''_2 - Z_{r2}/Z_{r1} * Y''_1) * (Z_{r3}/Z_{r1} * X_{r1} - X_{r3}) - (Y''_3 - Z_{r3}/Z_{r1} * Y''_1) * (Z_{r2}/Z_{r1} * X_{r1} - X_{r2})]$ Angle gamma $\gamma$ can then be solved using equation b)i) to obtain:

$$\mathrm{Cos}(\gamma) = [(Y''_2 * Z_{r1} - Z_{r2} * Y''_1)/(Z_{r1} * (Y'_2 - Y'_1))]$$

and $$\mathrm{Sin}(\gamma) = [(Y''_2 * Y'_1 - Y'_2 * Y''_1)/(Z_{r2} * Y'_1 31\ Z_{r1} * Y'_2)]$$

Knowing both the Sin and Cos of gamma $\gamma$ allows us to set the sign of the angle properly by making it equal to $-(\pi + \mathrm{old}\gamma)$ if $\mathrm{Cos}(\gamma) < 0$, after which we can easily obtain gamma $\gamma$ as:

$$\gamma = \mathrm{Cos}^{-1}[\mathrm{Cos}(\mathrm{adjusted}\gamma)]$$

Having obtained theta $\theta$ and gamma $\gamma$, we can now solve for phi $\phi$ numerically since it has often been found that a calculated value of phi $\phi$ produces too much error due to error propagation through the theta $\theta$ and gamma $\gamma$ calculations. This can be done by taking all of the equations a) through c) i) and ii) and computing $(X''_n, Y''_n, Z''_n)$ using angles theta $\theta$, gamma $\gamma$ and "test" angle phi $\phi_{test}$ which ranges over the full range of possible phi $\phi$ values. The "best" phi $\phi$ value will be the one that minimizes the error function that is $$E_{phi} = |X''_n - X_{ntest}| + |Y''_n 31\ Y''_{ntest}| + |Z''_n - Z''_{ntest}|$$

for n=1,2,3,4

As is usual in numeric solutions, phi $\phi$ values can be iterated over successively smaller ranges with finer incremental steps until the desired level of accuracy is reached.

Having completed the last step of the algorithm, a solution to the problem has been reached. X,Y,Z coordinates of the object have been computed, plus its theta $\theta$, gamma $\gamma$ and phi $\phi$ angular orientation offsets and there is complete information to be able to direct the object (through remote control of pan/tilt angle positioning) to point at any (X,Y,Z) position such as a moving performer. Having derived a method of obtaining the 3D X,Y,Z position and angular orientation offsets theta $\theta$, gamma $\gamma$, and phi $\phi$. It is now necessary to find the coordinates of the point $(X_p, Y_p, Z_p)$ lying in the plane $Z = Z_p$ and being pointed to by a pan/tilt tracking head located at (Xh, Yh, Zh, $\theta$H, $\gamma$H, $\phi$H) and having pointing angles $\beta$ (pan) and $\rho$ (tilt).

Figure 6A:
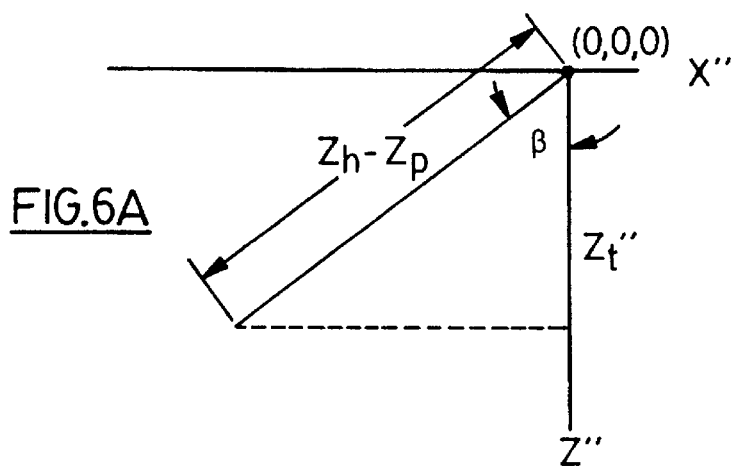
FIGS. 6A, 6B and 6C are further geometric figures used in calculating the location of a 3D point.

The process is started by choosing an arbitrary test point (Xt, Yt, Zt) located on the line of sight indicated by the pan/tilt head's pan and tilt angles. From the point of view of the pan/tilt head, the coordinates of the test point are (Xt", Yt", Zt") so that when using the pan/tilt head's pan/tilt/rotation axes as the frame of reference with the head located at X"0, Y"=0, Z"=0, the location (Xt", Yt", Zt") is obtained. It is convenient if the Zt" coordinate of the test point is arbitrarily set to be equal to the difference between the height of the head (Zh) and the plane Z=Zp so that we define Zt" as: $Zt'' = -(Zh - Zp) * \mathrm{Cos}(\rho)$. This is indicated by FIG. 6A.

Figure 6B:
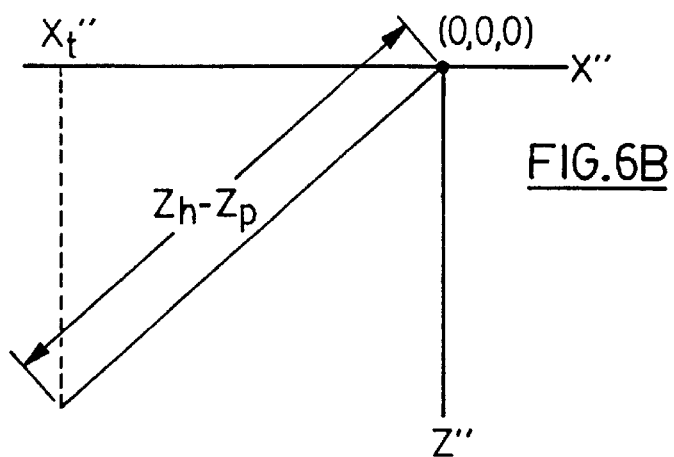
Figure 6C:
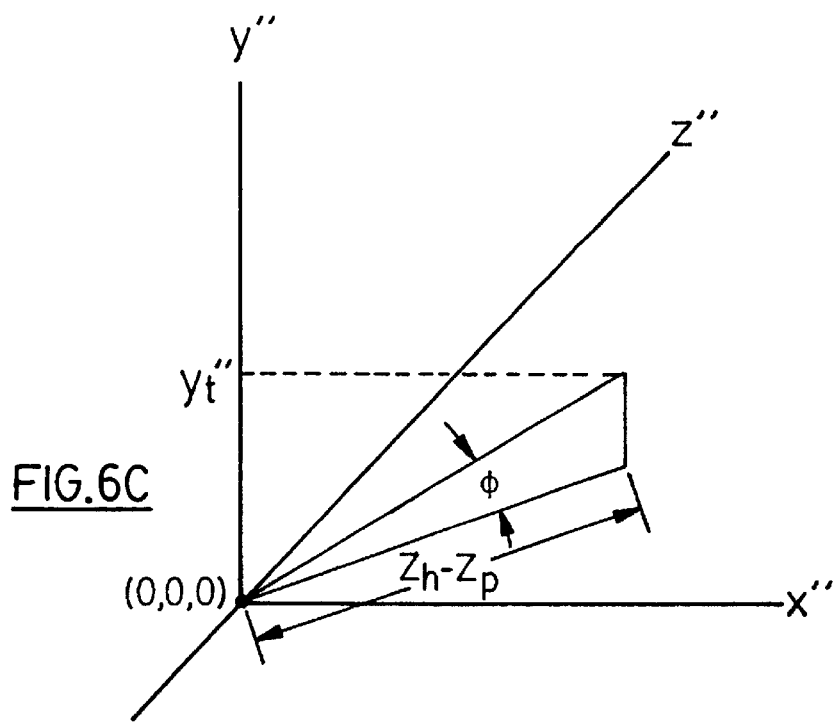

Given this situation, it is easy to calculate $Xt'' = (Zh - Zp) * \mathrm{Sin}(B)$ and $Yt'' = (Zh - Zp) * \mathrm{Tan}(B)$ as shown in FIGS. 6B and 6C.

Having calculated values for this point (Xt", Yt", Zt") the point may be "back-rotated" through the pan/tilt head's orientation angles $\phi$H, $\gamma$H, and $\theta$H to obtain the (Xt, Yt, Zt) coordinates of the same point. This is done through the following rotational transformations derived earlier for calculation of the initial position and orientation of an object capable of pan/tilt pointing. To transform from X", Y", Z" coordinates to X, Y, Z coordinates (still with the pan/tilt head as the origin) the following rotations are done in the following order:

1) Rotation about the Y" Axis:
   i) $X' = X'' * \mathrm{Cos}(-\phi H) + Z'' * \mathrm{Sin}(-\phi H)$
   ii) $Z' = X'' * \mathrm{Sin}*(-\phi H) + Z'' * \mathrm{Cos}(-\phi H)$
2) Rotation about the X' Axis:
   i) $Y' = Y'' * \mathrm{Cos}(-\gamma H) + Z' * \mathrm{Sin}(-\gamma H)$
   ii) $Ze = -Y'' * \mathrm{Sin}(\gamma H) + Z' * \mathrm{Cos}(-\gamma H)$
3) Rotation about Z Axis:
   i) $Xe = X' * \mathrm{Cos}(\theta H) + Y' * \mathrm{Sin}(\theta H)$
   ii) $Ye = -X' * \mathrm{Sin}(\theta H) + Y' * \mathrm{Cos}(\theta H)$ To convert from the pan/tilt head centered Xe, Ye, Ze to a normal origin, the X, Y, Z coordinates of the pan/tilt head are added, i.e.

Xt=Xe+Xh

Yt=Ye+Yh

Zt=Ze+Zh

The test point (Xt, Yt, Zt) will line on the pointing line along which the pan/tilt head is sighting. This point can thus be used plus the pan/tilt head location (Xh, Yh, Zh) to determine the equation of this line in 3-space. Given the equation of this sight line, a calculation may be made of where it intersects the plane Z=Zp and what the planar coordinates Xp, Yp of this point are. This may be done in the following manner:

From normal solid analytic geometry it is known that the equation of a line in 3-space is:

$$(X-X1)/u = (Y-Y1)/v = (Z-Z1)/w$$

where u=X2−X1, v=Y2−Y1, and w=Z2−Z1.

We set X1=Xh, Y1=Yh, Z1=Zh, X2=Xt, Y2=Yt, Z2=Zt, and X=Xp, Y=Yp, Z=Zp. Knowing Zp it is possible solve for Xp and Yp:

$$Xp = (Zp - Zh) * u/w + X1$$

or $$Xp = (Zp - Zh)/(Zt - Zh) * (Xt - Xh) + X1$$

$$Yp = (Zp - Zh) * v/w + Y1$$

or $$Yp = (Zp - Zh)/(Zt - Zh) * (Yt - Yh) + Y1$$

The values of Xp and Yp have now been calculated. Combined with the knowledge of the value for Zp the coordinates (Xp, Yp, Zp,) towards which the pan/tilt head is pointing are now known.

Given these calculations we now have enough information to be able to calculate the pan/tilt angles (or other control parameters) necessary to direct lights and other media to point at our virtual position (Xp, Yp, Zp). The calculation of such angules is straight forward to one skilled in the art and will not be detailed here.

What is claimed is:

1. A control system for variably operable apparatus in response to movement of an object over a large area characterized in that it comprises:

a fixed frame of reference (10) for said large area (10A), comprising at least four calibration points (1,2,3,4) any three of which are not collinear;

a further reference point of origin establishing X, Y and Z coordinates of each of said calibration points, the X, Y and Z coordinates being calculable;

a tracking head, having pan and tilt controls for tracking the movement of an object in the large area and measuring pan and tilt angles of the tracking head for each of said calibration points;

a variably operable system and means to establish control positions of the variably operable system for each of said calibration points;

computer means to calculate in real time from said X, Y and Z coordinates and from said pan and tilt angles, a series of pan and tilt angles for the variably operable system, a series of the X, Y, Z position and/or the pan, tilt and rotation angle offsets of the tracking head and the variably operable system; and means to set in real time the variably operable system into conformity with calculated pan and tilt angle offsets therefor.

2. A control system as claimed in claim 1 in which the variably operable system is a system selected from lighting systems, computer controllable cameras, music systems, sound effect systems and computer controllable video projectors.

3. A control system as claimed in claim 2 in which said variably operable system comprises a plurality of lamps.

4. A control system as claimed in claim 3 in which said means to establish control positions of said variably operable system includes means to independently operate each lamp.

5. A control system as claimed in claim 1 in which said pan and tilt controls for measuring pan and tilt angles of the tracking head are capable of 100–15000 measurements per second.

6. A method of controlling variably operable apparatus in response to movement of an object over a large area characterized in that it comprises:

establishing a fixed frame of reference for said large area, comprising at least four calibration points any three of which are not collinear;

establishing a further reference point of origin establishing X, Y and Z coordinates of each of said calibration points and calculating the X, Y and Z coordinates;

tracking the movement of an object in the large area using a tracking head, having pan and tilt controls and measuring pan and tilt angles of the tracking head for each of said calibration points;

establishing control positions of the variably operable system for each of said calibration points;

calculating in real time using computer means and algorithms, from said X, Y and Z coordinates and from said pan and tilt angles, a series of pan and tilt angles for the variably operable system, and a series of the X, Y, Z positions and of the pan, tilt and rotation angle offsets of the tracking head and the variably operable system; and setting in real time the variably operable system into conformity with calculated pan and tilt angle offsets therefor.

7. A method as claimed in claim 6 in which the variably operable system is a system selected from lighting systems, computer controllable cameras, music systems, sound effects systems and computer controllable video projectors.

8. A method as claimed in claim 7 in which said variably operable system comprises a plurality of lamps.

9. A method as claimed in claim 8 in which said means to establish control positions of said variably operable system includes means to independently operate each lamp.

10. A method as claimed in claim 6 in which 100–15000 measurements of pan and tilt angles of the tracking head are made each second.

11. A control system for a variably operable apparatus responsive to movement of an object over a large area, comprising:

a fixed frame of reference relative to said large area;

a tracking head at a known position and orientation relative to said frame of reference, said tracking head being pan and tilt rotatable relative to said frame of reference for line-of-sight tracking of the object as it moves over the large area, said tracking head having sensors for measuring pan and tilt angles of said tracking head;

a variably operable system at a known position and orientation relative to said frame of reference and remote from said tracking head;

computer means coupled to said sensors for determining the position of the object relative to said frame of reference based upon said pan and tilt angles and for calculating in real-time a control setting in response to the position of the object; and control means coupled to said computer means and said variably operable system, for controlling, in real-time, said variably operable system in response to the calculated control setting.

12. The control system as claimed in claim 11, wherein said control setting includes pan and tilt settings for said variably operable system.

13. The control system as claimed in claim 12, wherein said control means includes actuators coupled to said variably operable system for controlling the pan and tilt of said variably operable system in response to the pan and tilt settings.

14. The control system as claimed in claim 13, wherein said computer means calculates said pan and tilt settings so as to direct the variably operable system at the position of the object.

15. The control system as claimed in claim 14, wherein said variably operable system is a lighting system.

16. The control system as claimed in claim 11, wherein said control setting includes a setting for a parameter selected from the group consisting of pan, tilt, volume, frequency, phase, colour, timbre, amplitude and intensity.

17. The control system as claimed in claim 11, wherein said variably operable system includes a plurality of independently controllable sub-systems, wherein said computer means calculates a separate control setting for each of the sub-systems, and wherein said control means includes a separate control means for each of the sub-systems.

18. The control system as claimed in claim 17, wherein said variably operable system includes a lighting system and each sub-system includes a lamp.

19. The control system as claimed in claim 18, wherein said separate control setings include pan and tilt settings.

20. The control system as claimed in claim 17, wherein said variably operable system includes a sound system and each sub-system includes a speaker.

21. The control system as claimed in claim 11, wherein said frame of reference includes at least four calibration points any three of which are not collinear.

22. The control system as claimed in claim 21, wherein said frame of reference is coplanar with said large area.

23. The control system as claimed in claim 11, wherein said variably operable system is selected from lighting systems, camera systems, music systems, sound effect systems, and projector systems.

24. A method of controlling a variably operable apparatus in response to movement of an object over a large area, the method comprising the steps of:
(a) establishing a frame of reference relative to the large area;
(b) tracking, by line-of-sight, the movement of the object using a tracking head at a known position and orientation relative to the frame of reference, the tracking head being pan and tilt rotatable relative to the frame of reference and having sensors for measuring pan and tilt angles of the tracking head;
(c) determining the position of the object relative to the frame of reference in response to the measurements of the sensors;
(d) calculating in real-time a control setting for a variably operable system in response to the position of the object, the variably operable system being at a known position and orientation relative to the frame of reference; and
(e) controlling, in real-time, the variably operable system in response to the calculated control setting.

25. The method as claimed in claim 24, wherein said step of determining includes a step of triangulating the position of the object based upon the known position and orientation of the tracking head and the measurements of the pan and tilt sensors as the tracking head tracks the object.

26. The method as claimed in claim 25, wherein said control setting includes pan and tilt settings and said step of calculating includes triangulating the pan and tilt settings to direct the variably operable system at the position of the object.

27. The method as claimed in claim 26, wherein said variably operable system is a lighting system.

28. The method as claimed in claim 24, wherein said control setting includes pan and tilt settings and said step of controlling includes a step of controlling the pan and tilt orientation of said variably operable system to implement the pan and tilt settings.

29. The method as claimed in claim 28, wherein said variably operable system is a lighting system.

30. The method as claimed in claim 24, wherein the control setting includes a setting for a parameter selected from the group consisting of pan, tilt, volume, frequency, phase, colour, timbre, amplitude and intensity.

31. The method as claimed in claim 24, wherein said variably operable system is selected from lighting systems, camera systems, music systems, sound effect systems, and projector systems.

32. The method as claimed in claim 24, wherein the variably operable system includes a plurality of independently controllable sub-systems, wherein the step of calculating includes calculating a separate control setting for each of the sub-systems, and wherein the step of controlling includes includes independently controlling each of the sub-systems in response to its separate control setting.

33. The method as claimed in claim 32, wherein said variably operable system includes a lighting system and each sub-system includes a lamp.

34. The method as claimed in claim 24, wherein said step of establishing a frame of reference includes defining at least four calibration points any three of which are not collinear.

35. The method as claimed in claim 34, wherein said frame of reference is coplanar with said large area.

36. The method as claimed in claim 34, wherein said step of establishing a frame of reference further includes a step of defining a point of origin and calculating position coordinates for each of the at least four calibration points.

37. The method as claimed in claim 36, further including a step of calculating the known position of the tracking head including directing the tracking head at each of the at least for calibration points, reading the pan and tilt angles of the tracking head using the sensors when directed at each of the calibration points, and calculating the position of the tracking head based upon the pan and tilt readings and the coordinates of the calibration points.

* * * * *